United States Patent [19]

Schwindt et al.

[11] Patent Number: 5,459,197
[45] Date of Patent: Oct. 17, 1995

[54] COATING COMPOSITIONS, A PROCESS FOR THEIR PRODUCTION AND THEIR USE FOR COATING WATER-RESISTANT SUBSTRATES

[75] Inventors: Jürgen Schwindt; Helmut Reiff; Werner Kubitza, all of Leverkusen, Germany

[73] Assignee: Bayer Aktiengesellschaft, Leverkusen, Germany

[21] Appl. No.: 251,876

[22] Filed: Jun. 1, 1994

Related U.S. Application Data

[63] Continuation-in-part of Ser. No. 12,199, Feb. 2, 1993, abandoned.

[30] Foreign Application Priority Data

Feb. 7, 1992 [DE] Germany ............ 42 03 510.4

[51] Int. Cl.$^6$ ............... C08J 3/00; C08J 3/20; C08J 75/00; B32B 27/00
[52] U.S. Cl. ............ 524/591; 524/839; 524/840; 428/423.1
[58] Field of Search .............. 524/839, 840, 524/591, 507; 525/123, 455; 428/423.1

[56] References Cited

U.S. PATENT DOCUMENTS

| | | | |
|---|---|---|---|
| 4,031,052 | 6/1977 | Dhein et al. | 260/29.4 R |
| 4,171,294 | 10/1979 | Dhein et al. | 260/22 CQ |
| 4,276,210 | 6/1981 | Höhlein et al. | 260/29.4 UA |
| 4,615,779 | 10/1986 | McCollum et al. | 204/181.7 |
| 4,663,377 | 5/1987 | Hombach et al. | 524/196 |
| 5,075,370 | 12/1991 | Kubitza et al. | 524/591 |

FOREIGN PATENT DOCUMENTS

| | | |
|---|---|---|
| 6402684 | 3/1964 | Belgium . |
| 193685 | 9/1986 | European Pat. Off. . |
| 2446760 | 4/1976 | Germany . |
| 2034738 | 6/1980 | United Kingdom . |

Primary Examiner—Paul R. Michl
Assistant Examiner—Patrick Niland
Attorney, Agent, or Firm—Joseph C. Gil; Richard E. L. Henderson

[57] ABSTRACT

The present invention relates to an aqueous two-component coating composition wherein the binder contains (a) a component which is dissolved and/or dispersed in water, has an average hydroxyl number of 15 to 200 mg KOH/g, and contains (a1) a polyol component having a content of 8 to 450 milliequivalents, per 100 g of component (a1) solids, of chemically incorporated ammonium groups, $=N=^+$, comprising one or more polyaddition resins which are water-dilutable, contain hydroxyl groups, and have a molecular weight ($M_n$) of 500 to 20,000 and (a2) up to 10 wt %, based on the weight of component (a1), of one or more reactive diluents which are water-soluble, have a molecular weight ($M_n$) below 500, and contain at least one isocyanate-reactive group, and (b) a polyisocyanate component having an NCO content of 5 to 25 wt % comprising one or more polyisocyanates which are emulsified in the aqueous solution and/or dispersion of hydroxyl group-containing component (a), wherein components (a) and (b) are present in an amount sufficient to provide an equivalent ratio of isocyanate groups of component (b) to isocyanate-reactive groups of component (a) of 0.5:1 to 5:1.

The present invention also relates to a process for the production of this coating composition and to their use for the production of coatings on water-resistant substrates.

7 Claims, No Drawings

COATING COMPOSITIONS, A PROCESS FOR THEIR PRODUCTION AND THEIR USE FOR COATING WATER-RESISTANT SUBSTRATES

This application is a continuation-in-part of application Ser. No. 08/012,199, filed Feb. 2, 1993, abandoned.

BACKGROUND OF THE INVENTION

1. Field of the Invention

The present invention relates to a new aqueous coating composition containing a cationically modified polyol component dissolved and/or dispersed in water, optionally a reactive diluent and, emulsified therein, a polyisocyanate component; a process for the production of this coating composition; and its use for the production of coatings on water-resistant substrates.

2. Description of the Prior Art

Aqueous coating compositions are gaining increasing importance for economic and ecological reasons. However, the replacement of conventional, solvent-based coating compositions is proceeding more slowly than expected.

There are numerous reasons for this. Aqueous dispersions frequently still have processing disadvantages when compared to coating compositions dissolved in organic media. With aqueous solutions there is also the conflict between providing sufficient water dispersibility or solubility versus the contrary effect resulting therefrom of the lower resistance of the coatings to water. This is not a problem with coating compositions dissolved in organic solvents. In addition, there are also processing problems in this regard which result from the high viscosity of the aqueous coating compositions. These problems have previously been overcome by the use of organic auxiliary solvents. However, the amount of auxiliary solvent used in this connection is limited, since, otherwise, the ecological impact of the aqueous systems is lessened.

For this reason, in binder systems crosslinked with melamine resins (U.S. Pat. Nos. 4,031,052, 4,171,294 and 4,276,210 and German Offenlegungsschriften 2,446,760 and 2,847,532), water-dilutable reactive diluents have previously been used. These resins have a favorable effect on the solubility properties of the polymer systems and are also incorporated in the coatings by melamine resin crosslinking. However, the reactivity of many aqueous melamine resins is so low that high crosslinking temperatures are required such that the reactive diluents can escape from the coatings before crosslinking occurs.

Only recently have aqueous two-component polyurethane systems become known. For example, German Offenlegungsschrift 3,829,587 discloses systems in which the binder is based on a polyacrylate resin dissolved or dispersed in water in combination with a polyisocyanate containing free isocyanate groups emulsified in this dispersion or solution. The systems are essentially solvent-free, as is evident from the fact that the solvents used in the production of these polymer resins are removed before preparation of the aqueous composition. U.S. Pat. No. 5,194,487 discloses aqueous two-component polyurethane systems based on an anionically modified isocyanate-reactive polyurethane and a water-dispersible polyisocyanate. These known prior art systems can be used to produce high-grade coatings that are comparable in their properties to coatings prepared from solvent-containing coating compositions of analogous structure.

It has now surprisingly been found that aqueous two-component polyurethane coating compositions in which the polyol component is cationically as opposed to anionically modified have a considerably longer pot life and are as suitable as analogous systems based on anionically modified polyhydroxyl compounds for the production of high-grade coatings. The coating compositions according to the invention, which are described in more detail below, have pot lives of at least 8 hours to as much as several days.

SUMMARY OF THE INVENTION

The present invention relates to an aqueous two-component coating composition wherein the binder contains (a) a component which is dissolved and/or dispersed in water, has an average hydroxyl number of 15 to 200 mg KOH/g, and contains (a1) a polyol component having a content of 8 to 450 milliequivalents, per 100 g of component (a 1) solids, of chemically incorporated ammonium groups, $=N=^+$, comprising one or more polyaddition resins which are water-dilutable, contain hydroxyl groups, and have a molecular weight ($M_n$) of about 500 to about 20,000 (optionally in admixture with one or more polymerization and/or polycondensation resins which also are water-dilutable, contain hydroxyl groups, and have a molecular weight ($M_n$) of about 500 to about 20,000) and (a2) up to 10 wt %, based on the weight of component (a1), of one or more reactive diluents which are water-soluble, have a molecular weight ($M_n$) below 500, and contain at least one isocyanate-reactive group, and (b) a polyisocyanate component having an NCO content of 5 to 25 wt % comprising one or more polyisocyanates which are emulsified in the aqueous solution and/or dispersion of hydroxyl group-containing component (a), wherein components (a) and (b) are present in an amount sufficient to provide an equivalent ratio of isocyanate groups of component (b) to isocyanate-reactive groups of component (a) of 0.5:1 to 5:1.

The present invention also relates to a process for the production of this coating composition and to their use for the production of coatings on water-resistant substrates.

DETAILED DESCRIPTION OF THE INVENTION

Component (a) has an average hydroxyl number of 15 to 200, preferably 40 to 160, mg KOH/g and preferably an average hydroxyl functionality of at least 2.5, more preferably at least 3. Component (a) contains a polyol component (a1) which has a number average molecular weight ($M_n$) of from 500 to 20,000 or a mixture of polyol component (a1) with up to 10 wt %, based on the weight of (a1), of a water-soluble reactive diluent which has a number average molecular weight ($M_n$) below 500 and at least one group reactive towards isocyanate groups.

The aqueous solutions and/or dispersions of component (a) preferably contain 65 to 400, more preferably 100 to 240, parts by weight of water per 100 parts by weight of component (a).

Polyol component (a1) is selected from hydroxyl group-containing polyaddition resins having a number average molecular weight ($M_n$) of 500 to 20,000 (preferably 1500 to 5000) and a hydroxyl functionality of at least 2 (preferably at least 3), as well as mixtures of such polyaddition resins with one or more polymerization and/or polycondensation resins which also contain hydroxyl groups and have a molecular weight ($M_n$) of about 500 to about 20,000. If mixtures of such polyaddition resins with one or more polymerization and/or polycondensation resins are used, such mixtures preferably contain at least about 20% by weight (more preferably at least 50% by weight) of the polyaddition component. It is most preferred, however, to use only polyaddition resins in the absence of polymerization and/or polycondensation resins. Component (a) contains at least a portion of, and preferably exclusively contains, polyol components (a1) which have a content of incorporated ammonium groups, $=N=^+$, which is sufficient to solubilize or disperse component (a1) in water. It is possible, although not generally preferred, to use mixtures of polyhydroxyl compounds which contain both cationically modified polyols and also ionically unmodified polyols, provided that the proportion of the cationically modified polyols is sufficient to ensure the dispersibility or the solubility of the total mixture. The content of chemically incorporated ammonium groups, $=N=^+$, in polyol component (a1) is 8 to 450, preferably 25 to 250, milliequivalents per 100 g of solids.

Molecular weights ($M_n$) of less than 5000 are measured by vapor-pressure osmometry in dioxane and acetone, the low value being used when the values differed. Molecular weights ($M_n$) of greater than 5000 are determined by membrane osmometry in acetone.

The polyhydroxyl compounds of component (a1) may be cationically modified by the incorporation of tertiary nitrogen atoms and their subsequent conversion to an ammonium group by neutralization with an acid or by quaternization with a quaternizing agent.

Polyhydroxyl compounds suitable as component (a1) include polyaddition products that satisfy the above requirements. The polyaddition compounds often contain segments which have been formed by a polycondensation reaction or a polymerization reaction in addition to the segments formed by the polyaddition reaction. The preferred polyaddition resins are hydroxyl-containing polyurethane resins (i.e., polyols having urethane groups, as well as optional urea groups).

Examples of compounds which can be used as component (a1) or as a part of component (a1) or which can be converted by neutralization or quaternization into these compounds include the following:

(i) Polyols having urethane groups and tertiary nitrogen atoms which may be obtained in known manner from the conventional starting materials of polyurethane chemistry. These polyurethanes may be prepared by reacting less than stoichiometric amounts of polyisocyanates with low molecular weight, preferably at least difunctional, starting components having tertiary nitrogen atoms and groups reactive towards isocyanate groups (as exemplified hereafter); polyester polyols having a molecular weight ($M_n$) of 250 to 10,000 (preferably 1000 to 5000), which may or may not contain incorporated tertiary nitrogen atoms; polyether polyols having a molecular weight ($M_n$) of 250 to 10,000 (preferably 1000 to 5000), which may or may not contain incorporated tertiary nitrogen atoms; known polyhydric alcohols having a molecular weight of 62 to 250; and mixtures of these polyhydroxyl compounds. It is also often possible to prepare polyols having urethane groups by using low molecular weight aminoalcohols (such as diethanolamine) or mixtures of such aminoalcohols with diamines (such as hexamethylenediamine or isophorone diamine) as additional starting materials. If these preferred additional starting materials are used, the preferred method of preparing polyols having urethane groups involves initially preparing isocyanate prepolymers that are then allowed to react with such additional starting materials, thereby converting the isocyanate prepolymers into polyurethanes having urethane and urea groups as well as terminal hydroxy groups. Regardless of the method used to obtain urethane-modified polyhydroxyl compound, the nature and proportions of the reactants are chosen so that the urethane-modified polyhydroxyl compounds obtained satisfy the conditions previously set forth with regard to the content of tertiary nitrogen atoms, molecular weight, and OH number.

Suitable isocyanate-reactive compounds having tertiary nitrogen atoms include amines and/or alcohols such as N-methyldiethanolamine, N-methyldipropanolamine, N-butyldiethanolamine, N-butyldipropanolamine, N-stearyldiethanolamine, N-stearyldipropanolamine, triethanolamine, tripropanolamine, hydroxyethylmorpholine, 2-hydroxypropylmorpholine, hydroxyethylpiperazine, 2-hydroxypropylpiperazine, and alkoxylation products of these amines and/or alcohols.

Suitable polyhydric alcohols having a molecular weight of 62 to 250 include ethylene glycol, propylene glycol, butanediols, neopentyl glycols, cyclohexanedimethanols, 2-ethyl-1,3-propanediol, hexanediols, ether alcohols such as di- and triethylene glycols, ethoxylated bisphenols, perhydrogenated bisphenols, trimethylolethane, trimethylolpropane, glycerol, pentaerythritol, dipentaerythritol, mannitol and sorbitol; and monohydric chain-terminating alcohols such as methanol, propanol, butanol, cyclohexanol, and benzyl alcohol.

Suitable polyisocyanates for the production of these resins include hexamethylene diisocyanate, isophorone diisocyanate, 4,4'-diisocyanatodicyclohexylmethane, 2,4 - and/or 2,6-diisocyanatotoluene, and/or the isomeric or homologous polyisocyanates or polyisocyanate mixtures of the diphenylmethane series.

Examples of other compounds which can be used, preferably in lesser quantities, in admixture as a part of component (a1) include the following:

(ii) Polyether polyols having incorporated tertiary nitrogen atoms which can be produced by the propoxylation and/or ethoxylation of starter molecules having amine nitrogen. Such polyether polyols include the propoxylation and/or ethoxylation products of ammonia, ethanolamine, triethanolamine, ethylenediamine and mixtures of these amines.

(iii) Polyester or polyamide resins having tertiary nitrogen atoms which are prepared by the polycondensation of multivalent and optionally monovalent starting components. Known processes for polycondensation of alcohols and carboxylic acids are described, e.g., in Römpp's Chemielexikon, vol. 1, page 202, Frankh'sche Verlagsbuchhandlung, Stuttgart, 1966, and D. H. Solomon, The Chemistry of Organic Filmformers, pages 75–101, John Wiley & Sons Inc., New York, 1967.

Starting materials for preparing polycondensation resins include alcohols having 1 to 6, preferably 2 to 4 hydroxyl groups and a molecular weight of 32 to 500, preferably 62 to 250, such as ethylene glycol, propylene glycol, butanediols, neopentyl glycols, cyclohexanedimethanols, 2-ethyl-1,3-propanediol, hexanediols, ether alcohols such as di- and triethylene glycols, ethoxylated bisphenols, perhydrogenated bisphenols, trimethylolethane, trimethylolpropane, glycerol, pentaerythritol, dipentaerythritol, mannitol and sorbitol; and monohydric chain-terminating alcohols such as methanol, propanol, butanol, cyclohexanol, and benzyl alcohol;

multivalent carboxylic acids or carboxylic acid anhydrides having a molecular weight of 100 to 300, such as phthalic acid, phthalic anhydride, isophthalic acid, terephthalic acid, tetrahydrophthalic acid, hexahydrophthalic acid, trimellitic anhydride, pyromellitic anhydride, maleic anhydride, adipic acid and succinic anhydride;

aromatic or saturated aliphatic monocarboxylic acids such as benzoic acid, hexahydrobenzoic acid, butylbenzoic acid, coconut oil acids, and α-ethylhexanoic acid;

olefinically unsaturated fatty acids and derivatives of olefinically unsaturated fatty acids such as the fatty acids of linseed oil, soya oil, tung oil, safflower oil, dehydrated castor oil, cottonseed oil, groundnut oil and tall oil; synthetic olefinically unsaturated $C_{12-C22}$ fatty acids; and derivatives obtained by conjugation, isomerization, or dimerization of these unsaturated fatty acids;

oils corresponding to the previously mentioned natural fatty acids such as linseed oil, soya oil, tung oil, safflower oil, dehydrated castor oil, cottonseed oil, groundnut oil, tall oil and castor oil; and amines and/or alcohols having tertiary nitrogen atoms such as N-methyldiethanolamine, N-methyldipropanolamine, N-butyldiethanolamine, N-butyldipropanolamine, N-stearyldiethanolamine, N-stearyldipropanolamine, triethanolamine, tripropanolamine, hydroxyethylmorpholine, 2-hydroxypropylmorpholine, hydroxyethylpiperazine, 2-hydroxypropylpiperazine, and alkoxylation products of these amines and/or alcohols having a molecular weight ($M_n$) of less than 3000.

(iv) Polyhydroxypolyacrylates prepared by the known copolymerization of olefinically unsaturated monomers wherein a portion of these monomers have alcoholic hydroxyl groups and a portion have tertiary nitrogen atoms incorporated therein. Suitable monomers for the production of these polyacrylate resins include $C_1$–$C_8$, preferably $C_1$–$C_2$ alkyl methacrylates such as methyl or ethyl methacrylate; styrene; $C_1$–$C_8$ alkyl acrylates such as methyl, ethyl, n-propyl, isopropyl, n-butyl, n-hexyl or n-octyl acrylate; $C_2$–$C_8$-hydroxyalkyl (meth)acrylates such as hydroxyethyl (meth)acrylate, hydroxypropyl (meth)acrylate (e.g., an isomer mixture obtained by the addition of propylene oxide to (meth)acrylic acid), 4-hydroxybutyl (meth)acrylate and mixtures of such monomers; vinyl-toluenes; vinyl esters such as vinyl acetate; and monomers having tert-nitrogen atoms, e.g., such as the acrylate or methacrylate esters of alcohols having tertiary nitrogen atoms, such as N,N-dimethylaminoethanol, and N-(2-hydroxyethyl)-morpholine or -piperidine.

It is also possible to produce polyacrylate polyols having tertiary nitrogen atoms by the incorporation of the previously disclosed alcohols having tertiary nitrogen atoms via urethane groups. This is accomplished by reacting a portion of the hydroxyl groups of a polyacrylate polyol with tertiary nitrogen-containing isocyanatourethanes. These isocyanatourethanes may be produced, for example, by reacting monohydric alcohols having tertiary nitrogen atoms with a large excess of diisocyanate and subsequently removing the unreacted excess diisocyanate by distillation.

Suitable such mixtures must, of course, contain the required content of ammonium groups. The incorporated tertiary nitrogen atoms are converted into ammonium ions by neutralization or quaternization.

To achieve at least partial neutralization (protonation), the incorporated basic tertiary nitrogen atoms are treated with aliphatic acids such as formic acid, acetic acid, propionic acid, lactic acid, malonic acid, malic acid, tartaric acid, glyoxalic acid, methanesulphonic acid, oxalic acid, fumaric acid, succinic acid and adipic acid. These acids can be used as aqueous solution or anhydrous (e.g., methanesulphonic acid).

The neutralization may be carried out in bulk, in aqueous medium or in the inorganic phase. To produce an aqueous solution or dispersion of component (a1), it is often sufficient to mix the appropriate polyhydroxyl compounds having tertiary nitrogen atoms with an aqueous solution of an acid suitable for neutralization. If it is desired to produce anhydrous polyhydroxyl compounds, then neutralization with an anhydrous acid such as methanesulphonic acid is preferred. In this way an anhydrous salt is formed which can later be dissolved or dispersed by simple stirring with water.

The use of water-miscible solvents, such as acetone, during neutralization is also possible. In particular, acetone solutions of the at least partly neutralized polyhydroxyl compounds can simply be stirred with water and, if desired, the acetone can be removed by distillation.

Suitable alkylating agents are known and include methyl chloride, methyl bromide, methyl iodide, dimethyl sulphate, diethyl sulphate, ethyl p-toluenesulphonate, and chloroacetamide. The alkylation reaction can be carried out, for example, in the presence of solvents, such as acetone, acetonitrile, tert-butanol or ethyl acetate, at 20° to 100° C. with subsequent removal of solvent. The alkylation can also advantageously be carried out in the presence of small amounts of polar, high-boiling solvents, for example, N-methylpyrrolidone and the acetates of propylene glycol and glycerol, as well as propylene glycol n-butyl ether acetate and propylene glycol methyl ether acetate. These solvents are not removed and serve as coalescing agents during the subsequent formation of coatings.

Optional polyol component (a2) (i.e., the reactive diluent) is selected from compounds which contain at least one, preferably 2 to 4, isocyanate-reactive groups, are water-soluble and have a molecular weight ($M_n$) of less than 500, preferably less than 300.

Suitable monofunctional compounds include n-hexanol, n-octanol, and amides such as ε-caprolactam. The preferred compounds containing 2 to 4 isocyanate-reactive groups include ethylene glycol; propylene glycol; the isomeric butanediols, pentanediols, hexanediols, octanediols, polyethylene glycols and polypropylene glycols; glycerol; trimethylolpropane; pentaerythritol; sorbitol; mannitol; the ethoxylation or propoxylation products of these higher-functional alcohols; and mixtures of these compounds.

Optional component (a2) can be present in an amount of up to 10 wt %, preferably up to 5 wt %, based on the weight of component (a1). The nature and proportions of the individual components (a1) and (a2) are chosen such that component (a) has the required OH number and hydroxyl functionality.

Polyisocyanate component (b) is selected from polyisocyanates having aliphatically, cycloaliphatically, araliphatically, and/or aromatically bound isocyanate groups which may optionally contain nonionic hydrophilic groups and/or cationic groups. The polyisocyanate is preferably liquid at room temperature. Solid polyisocyanates may also be used, but they are preferably used with small amounts of solvents such as toluene, ethyl acetate, solvent naphtha, propylene glycol ether acetate, propylene glycol diacetate, dipropylene glycol diacetate, N-methylpyrrolidone or ethylene glycol dimethyl ether.

Polyisocyanate component (b) preferably has a viscosity of 50 to 10,000, more preferably 50 to 1000, mPa.s at 23° C. It is particularly preferred to use a polyisocyanate mixture having exclusively aliphatically and/or cycloaliphatically bound isocyanate groups, an average NCO functionality of 2.2 and 5.0, and a viscosity at 23° C. of 50 to 5000 mPa.s.

Suitable polyisocyanates for use as component (b) are polyisocyanates derivatives having aromatically or (cyclo)aliphatically bound isocyanate groups, preferably (cyclo)aliphatically bound isocyanate groups.

Polyisocyanate derivatives prepared from hexamethylene diisocyanate, 1-isocyanato-3,3,5-trimethyl-5-isocyanatomethylcyclohexane ("IPDI") and/or 4,4'-bis(isocyanatocyclohexyl)methane are very suitable, especially those prepared exclusively from hexamethylene diisocyanate. Polyisocyanate derivatives include polyisocyanates having biuret, urethane, uretdione, and/or isocyanurate groups. These polyisocyanates are generally prepared from diisocyanates and are preferably subsequently treated to remove excess starting isocyanate in known manner, preferably by distillation, to a residual content of less than 0.5 wt %.

Preferred polyisocyanate derivatives include polyisocyanates which contain biuret groups, are prepared from hexamethylene diisocyanate in accordance with the processes described, e.g., in U.S. Pat. Nos. 3,124,605, 3,358,010, 3,903,126, 3,903,127, or 3,976,622, and contain mixtures of N,N',N"-tris(6-isocyanatohexyl)biuret with minor amounts of its higher homolog; and polyisocyanates which contain isocyanurate groups, are prepared by the trimerization of hexamethylene diisocyanate in accordance with the process described, e.g., in U.S. Pat. No. 4,324,879, and contain mixtures of N,N',N"-tris(6-isocyanatohexyl)isocyanurate with minor amounts of its higher homolog. Especially preferred are polyisocyanates which contain uretdione and isocyanurate groups and are prepared by the catalytic oligomerization of hexamethylene diisocyanate in the presence of trialkylphosphines. Especially preferred are the latter polyisocyanates having a viscosity of 50 to 500 mPa.s at 23° C. and an NCO functionality of 2.2 to 5.0.

The less preferred aromatic polyisocyanates include polyisocyanate derivatives prepared from 2,4-diisocyanatotoluene or mixtures thereof with 2,6-diisocyanatotoluene or prepared from 4,4'-diisocyanatodiphenylmethane or mixtures thereof with its isomers and/or higher homologs. The aromatic polyisocyanate derivatives include those containing urethane groups which may be prepared by the reaction of excess amounts of 2,4-diisocyanatotoluene with polyhydric alcohols, such as trimethylolpropane, followed by removal by distillation of the unreacted excess diisocyanate. Other aromatic polyisocyanate derivatives include the trimers prepared from aromatic diisocyanates from which excess monomeric diisocyanates have preferably been removed by distillation following their production.

The use of hydrophilically modified polyisocyanates as component (b) or as a portion of component (b) is particularly preferred and is generally advantageous due to the additional emulsifying effect. Such hydrophilic modification of the polyisocyanates can be carried out by reacting a portion of the isocyanate groups with monovalent polyether alcohols having ethylene oxide units, for example, the ethoxylation products of monomeric alkanols having 5 to 100 ethylene oxide units per molecule. These polyether alcohols and their production are described for example in German Offenlegungsschrift 3,521,618. Cationic modification of the polyisocyanates can also be carried out for example by reacting the polyisocyanates with a less than stoichiometric amount of an aminoalcohol containing at least one tertiary amino group, which is then subsequently converted with a suitable acid, such as anhydrous methanesulphonic acid, or by quaternization, into an ammonium group.

Especially suitable polyisocyanates (b) are those having an NCO content of 5 to 30 wt %, an NCO functionality of 2.2 to 5.0, and a content of incorporated ammonium groups, $=N=^+$, of 10 to 250 milliequivalents per 100 g of polyisocyanate (b). The use of such cationically modified polyisocyanates is especially advantageous because in this embodiment both the component (a) and the polyisocyanate component (b) have incorporated cations. This results in a synergism such that at a constant total concentration of cations, better emulsifiability of the overall system can be observed.

It is also possible to modify polyisocyanate component (b) so that it contains both nonionic hydrophilic groups and cationic groups. It is also possible to use hydrophobic polyisocyanates without any hydrophilic modification. These polyisocyanates are also emulsifiable in the system since component (a) can perform the function of an emulsifier for these polyisocyanates.

The coating compositions according to the invention may also contain the known auxiliary agents and additives from polyurethane coatings technology. Examples include pigments, antifoaming agents, levelling agents, dispersant aids for pigment distribution, thickeners, driers, extenders, catalysts for the isocyanate addition reaction, and less preferably solvents that are not incorporated in the film.

To produce the coating compositions, the polyisocyanate component (b) is emulsified into the aqueous solution or dispersion of component (a1). Component (a2) can be stirred into the system before or after the addition of polyisocyanate component (b). The intermixing can be carried out simply by stirring at room temperature. The amount of polyisocyanate component (b) is selected to provide an equivalent ratio of isocyanate groups of component (b) to isocyanate-reactive groups of components (a) of 0.5:1 to 5:1, preferably 0.8:1 to 3:1. Components (a) and (b) are also preferably selected to provide an average functionality for these components with regard to the isocyanate addition reaction of at least 2.5 groups/mole.

If emulsifiable polyisocyanates are used, the coating compositions may also be prepared by emulsifying the polyisocyanates in water and then mixing them with the cationic polyhydroxyl compound. The reactive diluent may optionally be added in a final stage.

The optional auxiliary agents and additives are incorporated into the system by stirring, preferably before the addition of polyisocyanate component (b).

The present invention makes available for the first time, aqueous cationic two-component polyurethane coating compositions which cure to high-quality crosslinked coatings. This is due to the fact that the binder components (a) and (b) are essentially branched substances which cure to highly crosslinked systems and are neither soluble nor dispersible in water after the components have reacted. Accordingly, the coating compositions according to the invention having only a finite pot life such that they gel after a certain time period.

The fundamental advantage of the systems according to the invention over corresponding anionically modified systems is to that the pot life is considerably extended. In addition to ecological advantages of these new coating compositions and improvements in processing viscosity and flow properties, there is the additional ability to alter the coatings properties through the choice of the reactive diluent. Thus, brittle coatings can be adjusted to be more flexible by the appropriate choice of the reactive diluent, it is known that long chain diols have a flexibilizing effect.

In a binder system with a relatively low crosslinking density, harder and more resistant coatings can be produced through the use of tri- or polyfunctional reactive diluents.

The coatings may be cured either at room temperature or at elevated temperatures. The choice of the reactive diluents depends upon both the reactivity of the polyisocyanates and/or the catalysis, and on the curing conditions. More volatile reactive diluents should preferably be used when the composition is cured at room temperature or slightly elevated temperature. At higher stoving temperatures and long crosslinking times, the use of less volatile reactive diluents is recommended.

The aqueous binder systems according to the invention are suitable for coating any water-resistant substrates, especially for the production of air- or heat-drying coatings on wood, concrete, masonry or metallic substrates. They are also suitable for the corrosion protection of metals, such as steel, and as automotive coatings, especially as cationic primers.

The invention is further illustrated but is not intended to be limited by the following examples in which all parts and percentages are by weight unless otherwise specified.

EXAMPLES

POLYHYDROXYL COMPOUNDS

Polyester 1

A poly(neopentyl glycol adipate) having a molecular weight ($M_n$) of 1000.

Polyester 2

A poly(1,6-hexanediol/neopentyl glycol adipate) having a molecular weight ($M_n$) of 1700. (Weight ratio of diols 3:2).

Polyester 3

A polyethylene glycol adipate having a molecular weight ($M_n$) of 1750.

Polyether 1

A monohydric polyether alcohol having a molecular weight of 2150 and prepared by the alkoxylation of n-butanol using a mixture of ethylene oxide and propylene oxide at a weight ratio of EO:PO of 4:1.

Polyether 2

A monofunctional ethylene oxide polyether having a molecular weight of 1210 and prepared by the ethoxylation of 3-ethyl-3-hydroxymethyloxetane.

POLYISOCYANATES

Polyisocyanate 1

15 g of Polyether 2 and 15 g of hydroxyethylmorpholine were added with stirring at 50° C. to 250 g of a 70% solution of isophorone diisocyanate trimer in Solvesso 100 solvent. The mixture was heated to 100° C. and maintained at that temperature for 2 hours. After cooling to 80° C., the mixture was catalyzed with 3 drops of tin octanoate, held for 30 minutes at this temperature and dissolved at a concentration of 60% in 61.6 g of methoxypropyl acetate. Finally, at 50° C., the product was alkylated with 10.15 g of dimethyl sulphate in 90 g of methoxypropyl acetate. After 1 hour the product was cooled to room temperature. A 50% solution of a water-dispersible cationic polyisocyanate resin having an NCO content of 10.2% was obtained.

Polyisocyanate 2

37.5 g of Polyether 2 were added with stirring at 50° C. to 300 g of a 50% solution of isophorone diisocyanate trimer in propylene glycol diacetate. The mixture was heated to 100° C. and maintained at that temperature for 2 hours. After cooling to 80° C., the mixture was catalyzed with 1 drop of tin octanoate dissolved in 3.4 g of propylene glycol diacetate. The mixture was kept for 2 hours at this temperature and then cooled to room temperature. A 55% solution of a water-dispersible polyisocyanate resin was obtained having an NCO content of 13.0% and a viscosity of 370 mPa.s/23° C.

Polyisocyanate 3

The preparation of Polyisocyanate 2 was repeated except that the amount of propylene glycol diacetate was reduced to provide a 60% solution having an NCO content of 13.0% and a viscosity 780 mPa.s/23° C.

Polyisocyanate 4

132 g of a polyethylene oxide alcohol having a molecular weight of 350 and prepared by the ethoxylation of methyl glycol were added with stirring to 750 g of a hexamethylene diisocyanate trimer having an NCO content of 21.5%. The mixture was heated to 110° C. and maintained for 2.5 hours at that temperature. After cooling, a colorless resin having an NCO content of 16.7% was obtained.

Polyisocyanate 5

A hydrophilically modified polyisocyanate having an NCO content of 18.4% and was prepared according to Example 1 of U.S. Pat. No. 4,663,377 by reacting a hexamethylene diisocyanate trimer having an NCO content of 21.6% with an ethoxylated n-butanol having a molecular weight 1145.

Preparation of aqueous dispersions (a1) of cationically modified polyhydroxyl compounds

Example 1

123.8 g (0.472 moles) of 4,4'-diisocyanatodicyclohexylmethane (technical mixture of isomers) were added at 50° C. to 157.5 g (0.157 moles) of Polyester 1 and 18.74 g (0.157 moles) of N-methyldiethanolamine. The mixture was heated to 100° C. and that temperature was maintained for 2 hours. The mixture was then dissolved in 253 ml of acetone and the NCO content was determined. At 30° C., 29.6 g (0.281 moles) of diethanolamine were added and the mixture was then stirred for 10 minutes and neutralized with 11.34 g of (0.126 moles) of DL-lactic acid. After 5 minutes the product was dispersed with 775 ml of water and the solvent was then distilled off under vacuum. A fine particle size dispersion was obtained which had a solids content of 30% and a pH of 5. The solids had an OH number of 87 and contained 41 meq (milliequivalents) of ammonium nitrogen per 100 g.

Example 2

115.1 g (0.439 moles) of 4,4'-diisocyanatodicyclohexylmethane (technical mixture of isomers) were added at 50° C., to 165.2 g (0.165 moles) of Polyester 1 and 19.7 g (0.165 moles) of N-methyldiethanolamine. The mixture was heated to 100° C. and that temperature was maintained for 2 hours. The mixture was then dissolved in 253 ml of acetone and the NCO content was determined. At 30° C., 17.9 g (0.170 moles) of diethanolamine and 1.6 g (0.001 moles) of isophoronediamine were added and the mixture was then stirred for 10 minutes and neutralized with 12 g (0.104 moles) of 85% phosphoric acid. After 5 minutes the product was dispersed with 780 ml of water and the solvent was then distilled off under vacuum. A fine particle size dispersion was obtained which had a solids content of 31.7% and a pH of 4.7. The solids had an OH number of 57 and contained 44.8 meq of ammonium nitrogen per 100 g.

Example 3

115.1 g (0.439 moles) of 4,4'-diisocyanatodicyclohexylmethane (technical mixture of isomers) were added at 50° C. to 165.2 g (0.165 moles) of Polyester 1 and 19.7 g (0.165 moles) of N-methyldiethanolamine. The mixture was heated to 100° C. and that temperature was maintained for 2 hours. The product was then dissolved in 253 ml of acetone and the NCO content was determined. At 30° C., 19.2 g (0.183 moles) of diethanolamine were added and the mixture was then stirred for 10 minutes and neutralized with 13.4 g (0.149 moles) of DL-lactic acid dissolved in 20 ml of water. After 5 minutes the product was dispersed with 760 ml of water and the solvent was then distilled off under vacuum. A fine particle size dispersion was obtained which had a solids content of 32.4% and a pH of 4.7. The solids had an OH number of 63 and contained 44.7 meq of ammonium nitrogen per 100 g.

Example 4

81.5 g (0.311 moles) of 4,4'-diisocyanatodicyclohexylmethane (technical mixture of isomers) were added at 50° C. to 204.6 g (0.117 moles) of Polyester 3 and 13.9 g (0.117 moles) of N-methyldiethanolamine. The mixture was heated to 100° C. and that temperature was maintained for 3 hours. The product was then dissolved in 253 ml of acetone and the NCO content was determined. At 30° C., 12.4 g (0.118 moles) of diethanolamine were added and the mixture was then stirred for 10 minutes and neutralized with 9.5 g (0.105 moles) of DL-lactic acid dissolved in 20 ml of water. After 5 minutes, the product was dispersed with 750 ml of water and the solvent was then distilled off under vacuum. A fine particle size dispersion which had a solids content of 33.1% and a pH of 5.6. The solids had an OH number of 41 and contained 32 meq of ammonium nitrogen per 100 g.

Preparation of comparison aqueous dispersion of an anionically modified polyhydroxyl compound Example 5 (comparison)

The method of Example 1 was repeated using dimethylolpropionic acid instead of N-methyldiethanolamine to obtain a comparison anionic polyhydroxyl compound. That is, 123.8 g (0.472 moles) of 4,4'-diisocyanatodicyclohexylmethane (technical mixture of isomers) were added at 65° C. to 157.5 g (0.157 moles) of Polyester 1, 21.1 g (0.157 moles) of dimethylolpropionic acid and 15.9 g (0.157 moles) of triethylamine. The mixture was heated to 100° C. and that temperature was maintained for 2 hours. The NCO content was determined and the mixture was dissolved in 253 ml of acetone to obtain a solution with a solids content of 60% by weight. At 30° C., 29.6 g (0.282 moles) of diethanolamine were added and the mixture was then stirred for 5 minutes and dispersed with 760 ml of water. The solvent was distilled off under vacuum to yield a fine particle size dispersion having a solids content of 30% and an OH number of 87.

COATING EXAMPLES

Comparative Example 1

A 30% dispersion of an anionically modified hydroxyl group-containing polyacrylate resin (hydroxyl group content of the dispersion: 1.2%) was mixed with a hydrophobic, isocyanurate-group-containing polyisocyanate prepared from hexamethylene diisocyanate and having an NCO content of 19.8% using a disperser (NCO/OH equivalent ratio 0.25:1), and the resulting mixture was applied to a glass support. The pot life of the coating mixture as well as the mechanical and physical properties of the resulting coating are set forth in Table 1.

Comparative Examples 2 to 4

Comparative Example I was repeated with the exception that the NCO/OH equivalent ratios for Comparison Examples 2, 3, and 4 were 0.5:1, 0.75:1, and 1:1, respectively. The pot lives of the coating mixtures as well as the mechanical and physical properties of the resulting coatings are set forth in Table 1.

Comparative Examples 5 and 6

Comparative Example 1 was repeated with the exception that the NCO/OH equivalent ratios for Comparison Examples 5 and 6 were 2:1 and 3:1, respectively. The pot lives of the coating mixtures as well as the mechanical and physical properties of the resulting coatings are set forth in Table 1.

Coating Examples 1 to 4

The OH group-containing cationic polyurethane of Example 3 was mixed with each of Polyisocyanates 1, 2, 4, and 5 at an NCO/OH equivalent ratio of 0.25:1 using a disperser, and the resulting mixtures were applied to glass supports to prepare coatings. The pot lives of the coating mixtures and the mechanical and physical properties of the resulting coatings are set forth in Table 2.

Coating Examples 5 to 7

The cationic water-dilutable resins of Examples 3, 2, and 1 were mixed with Polyisocyanate 3 (30% in water) at an NCO/OH equivalent ratio of 0.5:1 using a disperser, and the resulting mixtures were applied to glass supports to prepare coatings. The pot lives of the coating mixture and the mechanical and physical properties of the resulting coatings are set forth in Table 3.

Coating Examples 8 to 10

Coating Examples 5 to 7 were repeated with the exception that the NCO/OH equivalent ratio was 0.75:1. The pot lives of the coating mixtures and the mechanical and physical properties of the resulting coatings are set forth in Table 3.

Coating Examples 11 to 13

Coating Examples 5 to 7 were repeated with the exception that the NCO/OH equivalent ratio was 1:1. The pot lives of the coating mixtures and the mechanical and physical properties of the resulting coatings are set forth in Table 3.

Coating Examples 14 and 15

The OH group-containing cationic polyurethanes of Examples 2 and 3 were each mixed with Polyisocyanate 3 (30% in water) at an NCO/OH equivalent ratio of 2:1 using a disperser, and the resulting mixtures were applied to glass supports to prepare coatings. The pot lives of the coating mixtures and the mechanical and physical properties of the resulting coatings are set forth in Table 3.

Coating Examples 16 and 17

Coating Examples 14 and 15 were repeated with the exception that the NCO/OH equivalent ratio was 3:1. The pot lives of the coating mixtures and the mechanical and physical properties of the resulting coatings are set forth in Table 3.

Coating Examples 18 and 19

Coating Examples 14 and 15 were repeated with the exception that the NCO/OH equivalent ratio was 4:1. The pot lives of the coating mixtures and the mechanical and physical properties of the resulting coatings are set forth in Table 3.

Coating Examples 20 and 21

The OH group-containing cationic polyurethanes of Examples 2 and 3 were each mixed with Polyisocyanate 4 (30% in water) at an NCO/OH equivalent ratio of 0.75:1 using a disperser, and the resulting mixtures were applied to glass supports to prepare coatings. The pot lives of the coating mixtures and the mechanical and physical properties of the resulting coatings are set forth in Table 4.

Coating Examples 22 and 23

Coating Examples 20 and 21 were repeated with the exception that the NCO/OH equivalent ratio was 1:1. The pot lives of the coating mixtures and the mechanical and physical properties of the resulting coatings are set forth in Table 4.

Coating Examples 24 and 25

Coating Examples 20 and 21 were repeated with the exception that the NCO/OH equivalent ratio was 2:1. The pot lives of the coating mixtures and the mechanical and physical properties of the resulting coatings are set forth in Table 4.

Coating Examples 26 and 27

Coating Examples 20 and 21 were repeated with the exception that the NCO/OH equivalent ratio was 3:1. The pot lives of the coating mixtures and the mechanical and physical properties of the resulting coatings are set forth in Table 4.

Coating Examples 28 and 29

Coating Examples 20 and 21 were repeated with the exception that the NCO/OH equivalent ratio was 4:1. The pot lives of the coating mixtures and the mechanical and physical properties of the resulting coatings are set forth in Table 4.

TABLE 1

| Comparative Example | NCO/OH | Pot life[1] (h) | Through-drying (h) | Working time (h) | Pendulum hardness (sec)/14 d | Turbidity |
| --- | --- | --- | --- | --- | --- | --- |
| 1 | 0.25:1 | >48 | 36–48 | 24–30 | 37 | 0–1 |
| 2 | 0.5:1 | >48 | 36–48 | 24–30 | 39 | 0–1 |
| 3 | 0.75:1 | 11–23 | 9–24 | 5 | 45 | 0–1 |
| 4 | 1:1 | 11–23 | 9 | 5 | 50 | 0 |
| 5 | 2:1 | 4–5 | 5 | 2–3 | 92 | 0 |
| 6 | 3:1 | 2–3 | 5 | 1–3 | 118 | 0 |

[1] Time in hours to gel formation

TABLE 2

| Coating Example | NCO/OH | Pot life (h) | Through-drying (h) | Working time (h) | Pendulum hardness (sec)/7 d | Turbidity |
| --- | --- | --- | --- | --- | --- | --- |
| 1 | 0.25:1 | >144 | >8 | >144 | 35 | 0 |
| 2 | 0.25:1 | >144 | >8 | >144 | 32 | 0 |
| 3 | 0.25:1 | >144 | >8 | >144 | 31 | specks |
| 4 | 0.25:1 | >96 | >8 | >72 | 36 | 0 |

TABLE 3

| Coating Example | NCO/OH | Pot life (h) | Through-drying (h) | Working time (h) | Pendulum hardness (sec)/3 d | Hydroxyl cpd. according to Example |
|---|---|---|---|---|---|---|
| 5 | 0.5:1 | >144 | 1.5 | >144 | 45 | 3 |
| 6 | 0.5:1 | >144 | 1.5 | >144 | 50 | 2 |
| 7 | 0.5:1 | >144 | 1.5 | >144 | 46 | 1 |
| 8 | 0.75:1 | >144 | 1.5 | >144 | 56 | 3 |
| 9 | 0.75:1 | >144 | 1.5 | >144 | 66 | 2 |
| 10 | 0.75:1 | >144 | 1.5 | >144 | 67 | 1 |
| 11 | 1:1 | >144 | 1.5 | >144 | 88 | 3 |
| 12 | 1:1 | >144 | 1.5 | >144 | 83 | 2 |
| 13 | 1:1 | >144 | 1.5 | >144 | 122 | 1 |
| 14 | 2:1 | >144 | 2.5 | >144 | 34 (1 d) | 3 |
| 15 | 2:1 | >144 | 3.0 | >144 | 31 (1 d) | 2 |
| 16 | 3:1 | >144 | 2.5 | >144 | 46 (1 d) | 1 |
| 17 | 3:1 | >144 | 3.0 | >144 | 31 (1 d) | 3 |
| 18 | 4:1 | >144 | 2.5 | >144 | 52 (1 d) | 2 |
| 19 | 4:1 | >24 | 3.0 | 10 | 35 (1 d) | 1 |

TABLE 4

| Coating Example | NCO/OH | Pot life (h) | Through-drying (h) | Working time (h) | Pendulum hardness (sec)/3 d | Hydroxyl cpd. according to Example |
|---|---|---|---|---|---|---|
| 20 | 0.75:1 | >144 | 2.5 | >144 | 45 | 3 |
| 21 | 0.75:1 | >144 | 3.0 | >144 | 42 | 2 |
| 22 | 1:1 | >144 | 2.5 | >144 | 49 | 3 |
| 23 | 1:1 | >144 | 3.0 | >144 | 52 | 2 |
| 24 | 2:1 | >144 | 2.5 | >144 | 34 (1 d) | 3 |
| 25 | 2:1 | >144 | 3.0 | >144 | 31 (1 d) | 2 |
| 26 | 3:1 | >144 | 2.5 | >144 | 46 (1 d) | 3 |
| 27 | 3:1 | >144 | 3.0 | >144 | 31 (1 d) | 2 |
| 28 | 4:1 | >144 | 2.5 | >144 | 52 (1 d) | 3 |
| 29 | 4:1 | >144 | 3.0 | >144 | 31 (1 d) | 2 |

Coating Example 30

410.1 g of the cationically modified polyhydroxyl compound of Example 3, 2.8 g of a commercial emulsifier (25% aqueous solution of "Emulsifier WN", manufacturer Bayer AG, Leverkusen) and 12 g of a 5% aqueous solution of a commercial thickener (Borchigel DP 40, manufacturer Gebr. Borchers AG) were mixed to prepare a pigmented coating composition. 85 g of a commercial iron oxide pigment (Bayferrox 130 BM, manufacturer Bayer AG) were dispersed in the mixture. 86.8 g of Polyisocyanate 2 were added to this formulation (NCO/OH equivalent ratio—1:1). The coating composition was homogenized with a dissolver and applied to two glass supports. One coating was cured at room temperature, while the other was cured at 120° C.

| Room temperature curing | | 120° C. curing/45 minutes | |
|---|---|---|---|
| Sand dry | 4 hours | Pendulum hardness | 100 sec |
| Through dry | 16 hours | Gloss 60° | 90 |
| Standing time | >2 days | | |
| Pendulum hardness | 20 seconds | | |
| Gloss 60° | 91 | | |

Coating Example 31

A formulation was prepared as in Example 30. To this formulation was added 183.6 g of Polyisocyanate 2, 1.34 g of trimethylolpropane as reactive diluent and 51 g of water (NCO/OH equivalent ratio 1:1). A coated was prepared as described in Example 30 and cured at room temperature.

| Sand dry | 5.5 hours |
|---|---|
| Through dry | 16 hours |
| Standing time | >2 days |
| Pendulum hardness | 20 seconds |
| Gloss 60° | 89 |

Comparison of coatings based on cationically modified polyhydroxyl compounds of the invention with corresponding coatings based on anionically modified polyhydroxyl compounds

Coating Examples 32–34 (comparison)

The OH group-containing anionic polyurethane of comparison Example 5 was mixed with Polyisocyanate 4 (30% in water) at NCO/OH equivalent ratios of 1:1.2:1, and 3:1 using a disperser and the resulting mixtures were applied to glass supports to prepare coatings. The pot lives and drying times of the coating mixtures are set forth in Table 5.

Coating Examples 35–37

Comparison Coating Examples 32–34 were repeated with the exception that the cationic polyurethane of Example 1 was used instead of the anionic polyurethane of comparison Example 5. The pot lives and drying times of the coating mixtures are set forth in Table 5. The use of a cationic polyurethane of the invention instead of an anionic polyurethane provided a dramatic increase in pot life and a simultaneous decrease in through-drying time.

TABLE 5

| Coating Example | NCO/OH | Pot life (h) | Through-drying (h) |
| --- | --- | --- | --- |
| 32 | 1:1 | 36 | 5 |
| 33 | 2:1 | 14 | 12 |
| 34 | 3:1 | 12 | 14 |
| 35 | 1:1 | >144 | 2.8 |
| 36 | 2:1 | >144 | 3.1 |
| 37 | 3:1 | >144 | 3.7 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous two-component coating composition wherein the binder comprises
   (a) a component which is dissolved and/or dispersed in water, has an average hydroxyl number of 15 to 200 mg KOH/g, and comprises
      (a1) a polyol component having a content of 8 to 450 milliequivalents, per 100 g of component (a1) solids, of chemically incorporated ammonium groups, $=N=^+$, comprising one or more polyurethane resins which are water-dilutable, contain hydroxyl groups, and have a molecular weight ($M_n$) of 500 to 20,000, and
      (a2) up to 10 wt %, based on the weight of component (a1), of one or more reactive diluents which are water-soluble, have a molecular weight ($M_n$) below 500, and contain at least one isocyanate-reactive group, and
   (b) a polyisocyanate component having an NCO content of 5 to 25 wt % comprising one or more polyisocyanates which are emulsified in the aqueous solution and/or dispersion of hydroxyl group-containing component (a), wherein components (a) and (b) are present in an amount sufficient to provide an equivalent ratio of isocyanate groups of component (b) to isocyanate-reactive groups of component (a) of 0.5:1 to 5:1.

2. The coating composition of claim 1 wherein the average functionality of each of components (a) and (b) in the context of the isocyanate addition reaction is at least 2.5.

3. The coating composition of claim 1 wherein said reactive diluent comprises a polyhydric alcohol which has a molecular weight of 62 to 300 and optionally contains ether and/or ester groups.

4. The coating composition of claim 2 wherein said reactive diluent comprises a polyhydric alcohol which has a molecular weight of 62 to 300 and optionally contains ether and/or ester groups.

5. The coating composition of claim 1 wherein said polyisocyanates comprise polyisocyanate derivatives which contain non-ionic hydrophilic and/or cationic groups and have an average NCO functionality of 2.2 to 3.5.

6. A process for the preparation of the coating composition of claim 1 which comprises incorporating any auxiliaries and additives into the solution or dispersion of polymer component (a) and subsequently emulsifying polyisocyanate component (b) into the solution or dispersion of polyol component (a).

7. A water-resistant substrate coated with the coating composition of claim 1.

* * * * *